(12) United States Patent
Nguyen et al.

(10) Patent No.: US 7,763,555 B2
(45) Date of Patent: *Jul. 27, 2010

(54) HURRICANE RESISTANT COMPOSITES

(75) Inventors: Huy X. Nguyen, Midlothian, VA (US); John E. Holland, Bailey, NC (US); Connie W. Holland, Bailey, NC (US)

(73) Assignee: Honeywell International Inc., Morristown, NJ (US)

( * ) Notice: Subject to any disclaimer, the term of this patent is extended or adjusted under 35 U.S.C. 154(b) by 295 days.

This patent is subject to a terminal disclaimer.

(21) Appl. No.: 11/895,769

(22) Filed: Aug. 27, 2007

(65) Prior Publication Data

US 2009/0061714 A1 Mar. 5, 2009

(51) Int. Cl.
*B32B 5/26* (2006.01)
*D03D 15/00* (2006.01)

(52) U.S. Cl. .................. 442/239; 442/243; 442/268; 442/286; 442/301; 428/219

(58) Field of Classification Search ............. 442/239, 442/243, 268, 286, 301; 428/219
See application file for complete search history.

(56) References Cited

U.S. PATENT DOCUMENTS

| | | | |
|---|---|---|---|
| 4,137,394 A | 1/1979 | Meihuizen et al. ............ 528/100 |
| 4,356,138 A | 10/1982 | Kavesh et al. ................ 264/164 |
| 4,413,110 A | 11/1983 | Kavesh et al. ............. 526/348.1 |
| 4,457,985 A | 7/1984 | Harpell et al. ............... 428/224 |
| 4,815,562 A | 3/1989 | Denny et al. ................ 182/138 |
| 5,702,657 A | 12/1997 | Yoshida et al. .............. 264/112 |
| 5,822,943 A | 10/1998 | Frankoski et al. ............. 52/518 |
| 5,914,175 A | 6/1999 | Nudo et al. .................. 428/178 |
| 6,057,029 A | 5/2000 | Demestre et al. ............ 428/221 |
| 6,089,300 A | 7/2000 | Woodside et al. |
| 6,119,422 A | 9/2000 | Clear et al. ................. 52/309.8 |
| 6,125,905 A * | 10/2000 | Woodside et al. ............. 160/67 |
| 6,176,050 B1 | 1/2001 | Gower ......................... 52/222 |
| 6,263,949 B1 | 7/2001 | Guthrie, Jr. ................. 160/380 |
| 6,280,546 B1 | 8/2001 | Holland et al. ................ 156/85 |
| 6,286,579 B1 | 9/2001 | Gottschalk ................... 160/264 |
| 6,296,039 B1 | 10/2001 | Mullet et al. ............. 160/267.1 |
| 6,325,085 B1 | 12/2001 | Gower ......................... 135/90 |
| 6,341,455 B1 | 1/2002 | Gunn .......................... 52/202 |
| 6,412,540 B2 | 7/2002 | Hendee ....................... 160/327 |
| 6,481,166 B2 | 11/2002 | Shelton ...................... 52/167.1 |
| 6,536,176 B1 | 3/2003 | Nordgren et al. ......... 52/506.01 |
| 6,705,054 B2 | 3/2004 | Pelton .......................... 52/203 |
| 6,818,091 B1 | 11/2004 | Holland et al. ........... 156/309.6 |
| 6,851,464 B2 | 2/2005 | Hudoba et al. ................ 160/31 |
| 6,865,852 B2 | 3/2005 | Gower .......................... 52/222 |
| 6,886,299 B2 | 5/2005 | Gower .......................... 52/222 |
| 6,886,300 B2 | 5/2005 | Hudoba et al. ................ 52/222 |
| 6,959,748 B2 | 11/2005 | Hudoba ....................... 160/31 |
| 7,082,733 B2 | 8/2006 | Nordgren et al. ......... 52/506.01 |
| 7,622,406 B2 | 11/2009 | Holland et al. ............. 442/286 |
| 2001/0039777 A1 | 11/2001 | Karalic .................... 52/407.01 |
| 2003/0079430 A1 | 5/2003 | Hanks ...................... 52/506.01 |
| 2003/0159372 A1 | 8/2003 | Motro ......................... 52/202 |
| 2003/0159373 A1 | 8/2003 | Lien ............................ 52/202 |
| 2003/0186606 A1 * | 10/2003 | Sutherland et al. .......... 442/301 |
| 2004/0010988 A1 | 1/2004 | Jaycox et al. ................. 52/202 |
| 2004/0154242 A1 | 8/2004 | Hudoba et al. ................ 52/202 |
| 2004/0221534 A1 | 11/2004 | Hanks ...................... 52/506.01 |
| 2005/0138891 A1 | 6/2005 | Wood et al. ................. 52/782.1 |
| 2005/0144900 A1 | 7/2005 | Hallissy et al. ............. 52/782.1 |
| 2005/0279465 A1 | 12/2005 | Gower ..................... 160/368.1 |
| 2006/0019062 A1 | 1/2006 | Hanks et al. ................ 428/116 |
| 2006/0068158 A1 * | 3/2006 | Howland .................... 428/105 |
| 2006/0070347 A1 | 4/2006 | Gupta et al. ................ 52/784.1 |
| 2006/0101758 A1 | 5/2006 | Egan ........................... 52/408 |
| 2006/0150554 A1 | 7/2006 | Hanks | |
| 2006/0151132 A1 | 7/2006 | Scalfani et al. | |

FOREIGN PATENT DOCUMENTS

| WO | WO2004108410 | 12/2004 |
|---|---|---|
| WO | WO2005123769 | 12/2005 |

* cited by examiner

*Primary Examiner*—Norca L Torres-Velazquez
(74) *Attorney, Agent, or Firm*—Erika S. Wilson

(57) ABSTRACT

A composite flexible fabric is employed as a covering for an opening of a building, such as a window or door. The composite fabric protects the opening from hurricane force winds and associated flying objects. The composite fabric is formed from at least one layer of a fabric comprised of high tenacity fibers and at least one ultraviolet radiation resistant layer which is attached to the high tenacity fiber fabric. The UV resistant layer limits transmission of both UVA and UVB rays preferably to less than about 10% of the radiation incident upon such layer. Preferably, the UV resistant layer is a woven fabric, and the layer of high tenacity fibers is a woven fabric of extended chain polyethylene fibers. An adhesive layer may be used to enhance bonding between the fabric layer and the UV resistant layer.

26 Claims, No Drawings

HURRICANE RESISTANT COMPOSITES

CROSS-REFERENCE TO RELATED APPLICATIONS

This application is related to application Ser. No. 11/657,302, filed Jan. 24, 2007.

BACKGROUND OF THE INVENTION

1. Field of the Invention

This invention relates to a barrier material to protect property against damage caused by high winds and impact from associated flying objects that result from a hurricane or similar occurrence.

2. Description of the Related Art

Various devices and materials have been proposed, some of which are currently utilized, for the protection of building openings (such as windows, doors and sliding glass doors) from the effects of high winds and flying objects associated with a hurricane or similar event. In the simplest form, sheets of plywood have been used which are nailed or screwed to a building as a covering for windows and doors. The user needs to cut plywood sheets to the proper opening dimensions and install them. Due to their bulkiness and weight, plywood structures are typically installed only when a hurricane or similar incident is imminent. Plywood covered building openings leave a lot to be desired from an aesthetic viewpoint, and are not suitable for remaining in place for any long period of time. The plywood sheets need removed by hand after the threat of damage has passed. The securing system (nails, etc.) may cause damage to the building structure. In addition, plywood has limited deflection and as such wood studs (e.g., 2×4 studs) may penetrate the plywood. Also, if the plywood is not properly attached to the building then the plywood itself may become a projectile and cause damage.

Another opening protective system that has been utilized for some time is a plurality of corrugated steel, aluminum or other metal panels. These panels usually have holes provided at several locations along their periphery and are adapted to be positioned on screws that have been secured to the building around the opening to be protected. Wing nuts are typically used to secure the metal panels to the screws, and the panels are held in place by a combination of the screw-wing nut assembly and rails that at least partially surround the window or door. Like plywood, these panels are usually very heavy. They also need to be installed before a hurricane event and removed afterwards. Likewise, they are relatively unattractive and are not intended from an aesthetic viewpoint for long term use to cover a building structure. Also like the plywood system, these metal panels or "shutters" block must be stored in a place which permits the panels to be readily obtained when needed. Thus the metal shutters provide an inconvenient although effective protection against the effects of a hurricane or other storm event.

One system that has been used to provide light into a building while providing protection against hurricanes are heavy corrugated plastic sheets, such as those formed of polycarbonate. These sheets are typically installed in a manner similar to the metal panels. They are cumbersome to install and also require significant storage space. Combinations of metal and plastic panels have also been suggested in U.S. Pat. No. 6,615,555. These products also lack aesthetics.

Another type of protective device is a flexible metal shutter that is formed from interconnected metal slats. These shutters may be manually or electrically operated and are permanent attachments to the building. They are adapted to be rolled up or open laterally in an accordion-like manner. Although these structures offer acceptable protection, they likewise permit very little light to penetrate when they are in their protective position. These systems also tend to be the most expensive and typically only come in a limited number colors (usually beige or white). Although they have better aesthetics than plywood or metal coverings, as mentioned they are relatively expensive.

Still another protective system is a coated fabric made from a plastic coated polyester material. The coated fabric is typically substantially thick to provide the necessary protection against wind and flying object damage. The fabric is provided with grommets along its periphery and is secured to the building usually using screws that are attached to the building and wing nut fasteners. These fabrics are heavy and difficult to install, and are relatively bulky to store. Such fabrics have relatively high deflection at low velocities and may lose their shape and tightness.

Other fabric protective systems are disclosed, for example, in U.S. Pat. Nos. 6,176,050, 6,263,949, 6,851,464 and 6,886,300, as well as in the following U.S. patent application publications: 2003/0079430, 2004/0154242 and 2004/10221534, the disclosures of which are expressly incorporated herein by reference to the extent not inconsistent herewith.

Applicants have discovered that a need exists to provide a lightweight hurricane resistant product that is relatively inexpensive, easier to store, provides the requisite protection against high winds and associated flying objects, and is aesthetically attractive. Such a product could be left in place for quite some time without detracting from the overall appearance of a house or other building structure.

SUMMARY OF THE INVENTION

In accordance with this invention, there is provided a building having at least one opening, the opening being protected from hurricane force winds and associated flying objects by a flexible composite fabric covering the opening, the flexible composite fabric comprising:

(a) at least one base layer of a fabric comprising high tenacity fibers having first and second surfaces; and (b) at least one UV resistant layer extending outwardly from the base fabric layer and attached to at least a portion of at least one of the first and second surfaces of the base fabric layer, whereby the opening is protected against hurricane force winds and associated flying objects, and resists degradation due to UV radiation.

Also in accordance with this invention, there is provided in a building having an opening, and a protective screening covering the opening, the improvement comprising the screening comprising a flexible composite fabric comprising:

(a) at least one base layer of a fabric comprising high tenacity fibers having first and second surfaces; and (b) at least one UV resistant layer extending outwardly from the base fabric layer and attached to at least a portion of at least one of the first and second surfaces of the base fabric layer;

whereby the opening is protected against hurricane force winds and associated flying objects, and resists degradation due to UV radiation.

Further in accordance with this invention, there is provided a method of protecting a building opening from hurricane force winds and associated flying objects, the method comprising providing a screening for the building opening, the screening comprising a flexible composite fabric covering the opening, the flexible composite fabric comprising:

(a) at least one base layer of a fabric comprising high tenacity fibers having first and second surfaces; and (b) at least one UV resistant layer extending outwardly from the base fabric layer and attached to at least a portion of at least one of the first and second surfaces of said base fabric layer;

whereby the opening is protected against hurricane force winds and associated flying objects, and resists degradation due to UV radiation.

In further accordance with this invention, there is provided a lightweight storm curtain for covering at least one opening in a building structure, such as windows, doors, sliding glass doors and the like, and for protecting the opening from hurricane force winds and associated flying objects, the storm curtain comprising a flexible composite fabric, the fabric comprising:

(a) at least one base layer of a fabric having first and second surfaces, said fabric comprising yarns comprising high tenacity fibers; and (b) at least one UV resistant layer extending outwardly from the base fabric layer and attached to at least a portion of at least one of the first and second surfaces of said base fabric layer.

In still further accordance with this invention, there is provided a lightweight storm curtain for covering at least one opening in a building structure, such as windows, doors, sliding glass doors and the like, and for protecting the opening from hurricane force winds and associated flying objects, the storm curtain comprising:

(a) a flexible composite fabric comprising:
  (i) at least one base layer of a fabric having first and second surfaces, the fabric formed of yarns comprising high tenacity fibers, the yarns having a denier in the range from about 50 to about 5000;
  (ii) at least one UV resistant layer extending outwardly from the base fabric layer and attached to at least a portion of the base fabric layer; and
  (iii) at least one adhesive layer bonding one of the surfaces of said base layer to the UV resistant layer; and (b) a retainer releaseably connecting the composite fabric to the building structure in such a manner as to cover the opening;

the composite fabric layer limiting transmission of UV radiation from entering said building structure and providing protection against high wind and impact from projectiles.

The invention thus provides a protective barrier system which is lightweight and thus easier to install and less bulky to store. The composite structure has sufficient strength to provide the requisite protection against hurricane force winds, but also is resistant to UV radiation such that it may be retained in place for a relatively long period of time without losing its attractiveness due to fading and the like. The structure is flexible and can be in roll form or sheet form. The structure is also resistant to water that may be impacted against it by high winds. The structure preferably also includes a bonding layer which bonds the fabric layer to the UV resistant layer.

DETAILED DESCRIPTION OF THE INVENTION

The hurricane resistant composite structures of this invention include at least one layer of a fabric comprising high tenacity fibers and at least one ultraviolet ray resistant layer that is attached thereto. Desirably, the adhesion between the high tenacity fiber fabric and the UV resistant layer is enhanced by utilizing an adhesive or bonding layer.

For the purposes of the present invention, a fiber is an elongate body the length dimension of which is much greater that the transverse dimensions of width and thickness. Accordingly, the term "fiber" includes monofilament, multifilament, ribbon, strip, staple and other forms of chopped, cut or discontinuous fiber and the like having regular or irregular cross-sections. The term "fiber" includes a plurality of any of the foregoing or a combination thereof. A yarn is a continuous strand comprised of many fibers or filaments. Fibers may also be in the form of split film or tape.

The cross-sections of fibers useful herein may vary widely. They may be circular, flat or oblong in cross-section. They may also be of irregular or regular multi-lobal cross-section having one or more regular or irregular lobes projecting from the linear or longitudinal axis of the fibers. It is preferred that the fibers be of substantially circular, flat or oblong cross-section, most preferably circular.

The yarns may be of any suitable denier, such as, for example, about 50 to about 5000 denier, more preferably from about 200 to about 5000 denier, still more preferably from about 650 to about 3000 denier, and most preferably from about 800 to about 1500 denier.

As used herein, the term "high tenacity fibers" means fibers which have tenacities equal to or greater than about 7 g/d. Preferably, these fibers have initial tensile moduli of at least about 150 g/d and energies-to-break of at least about 8 J/g as measured by ASTM D2256. As used herein, the terms "initial tensile modulus", "tensile modulus" and "modulus" mean the modulus of elasticity as measured by ASTM 2256 for a yarn and by ASTM D638 for an elastomer or matrix material.

Preferably, the high tenacity fibers have tenacities equal to or greater than about 10 g/d, more preferably equal to or greater than about 15 g/d, even more preferably equal to or greater than about 20 g/d, and most preferably equal to or greater than about 25 g/d.

High strength fibers useful in the yarns and fabrics of the invention include highly oriented high molecular weight polyolefin fibers, particularly high modulus (or high tenacity) polyethylene fibers and polypropylene fibers, aramid fibers, polybenzazole fibers such as polybenzoxazole (PBO) and polybenzothiazole (PBT), polyvinyl alcohol fibers, polyacrylonitrile fibers, liquid crystal copolyester fibers, graphite fibers, carbon fibers, basalt or other mineral fibers, rigid rod polymer fibers, and mixtures and blends thereof. Preferred high strength fibers useful in this invention include polyolefin fibers (more preferably high tenacity polyethylene fibers), aramid fibers, polybenzazole fibers, and mixtures and blends thereof. Most preferred are high tenacity polyethylene fibers and/or aramid fibers; such high tenacity polyethylene fibers are also referred to as extended chain polyethylene fibers or highly oriented high molecular weight polyethylene fibers.

U.S. Pat. No. 4,457,985 generally discusses such high molecular weight polyethylene and polypropylene fibers, and the disclosure of this patent is hereby incorporated by reference to the extent that it is not inconsistent herewith. In the case of polyethylene, suitable fibers are those of weight average molecular weight of at least about 150,000, preferably at least about one million and more preferably between about two million and about five million. Such high molecular weight polyethylene fibers may be spun in solution (see U.S. Pat. No. 4,137,394 and U.S. Pat. No. 4,356,138), or a filament spun from a solution to form a gel structure (see U.S. Pat. No. 4,413,110, German Off. No. 3,004,699 and GB Patent No. 2051667), or the polyethylene fibers may be produced by a rolling and drawing process (see U.S. Pat. No. 5,702,657). As used herein, the term polyethylene means a predominantly linear polyethylene material that may contain minor amounts of chain branching or comonomers not exceeding about 5 modifying units per 100 main chain carbon atoms, and that may also contain admixed therewith not more than about 50 weight percent of one or more polymeric additives such as alkene-l-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as antioxidants, lubricants, ultraviolet screening agents, colorants and the like which are commonly incorporated.

High tenacity polyethylene fibers (also referred to as extended chain or high molecular weight polyethylene fibers) are preferred and are available, for example, under the trademark SPECTRA® fibers and yarns from Honeywell International Inc. of Morristown, N.J., U.S.A.

Depending upon the formation technique, the draw ratio and temperatures, and other conditions, a variety of properties can be imparted to these fibers. The tenacity of the polyethylene fibers are at least about 7 g/d, preferably at least about 15 g/d, more preferably at least about 20 g/d, still more preferably at least about 25 g/d and most preferably at least about 30 g/d. Similarly, the initial tensile modulus of the fibers, as measured by an Instron tensile testing machine, is preferably at least about 300 g/d, more preferably at least about 500 g/d, still more preferably at least about 1,000 g/d and most preferably at least about 1,200 g/d. These highest values for initial tensile modulus and tenacity are generally obtainable only by employing solution grown or gel spinning processes. Many of the filaments have melting points higher than the melting point of the polymer from which they were formed. Thus, for example, high molecular weight polyethylene of about 150,000, about one million and about two million molecular weight generally have melting points in the bulk of 138° C. The highly oriented polyethylene filaments made of these materials have melting points of from about 7° C. to about 13° C. higher. Thus, a slight increase in melting point reflects the crystalline perfection and higher crystalline orientation of the filaments as compared to the bulk polymer.

Preferably the polyethylene employed is a polyethylene having fewer than about one methyl group per thousand carbon atoms, more preferably fewer than about 0.5 methyl groups per thousand carbon atoms, and less than about 1 weight percent of other constituents.

Similarly, highly oriented high molecular weight polypropylene fibers of weight average molecular weight at least about 200,000, preferably at least about one million and more preferably at least about two million may be used. Such extended chain polypropylene may be formed into reasonably well oriented filaments by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is preferably at least about 8 gtd, more preferably at least about 11 g/d. The initial tensile modulus for polypropylene is preferably at least about 160 g/d, more preferably at least about 200 g/d. The melting point of the polypropylene is generally raised several degrees by the orientation process, such that the polypropylene filament preferably has a main melting point of at least about 168° C., more preferably at least 170° C. The particularly preferred ranges for the above described parameters can advantageously provide improved performance in the final article. Employing fibers having a weight average molecular weight of at least about 200,000 coupled with the preferred ranges for the above-described parameters (modulus and tenacity) can provide advantageously improved performance in the final article.

In the case of extended chain polyethylene fibers, preparation and drawing of gel-spun polyethylene fibers are described in various publications, including U.S. Pat. Nos. 4,413,110; 4,430,383; 4,436,689; 4,536,536; 4,545,950; 4,551,296; 4,612,148; 4,617,233; 4,663,101; 5,032,338; 5,246,657; 5,286,435; 5,342,567; 5,578,374; 5,736,244; 5,741,451; 5,958,582; 5,972,498; 6,448,359; 6,969,553 and U.S. patent application publication 2005/0093200, the disclosures of which are expressly incorporated herein by reference to the extent not inconsistent herewith.

In the case of aramid fibers, suitable fibers formed from aromatic polyamides are described, for example, in U.S. Pat. No. 3,671,542, which is incorporated herein by reference to the extent not inconsistent herewith. Preferred aramid fibers will have a tenacity of at least about 20 g/d, an initial tensile modulus of at least about 400 g/d and an energy-to-break at least about 8 J/g, and particularly preferred aramid fibers will have a tenacity of at least about 20 g/d and an energy-to-break of at least about 20 J/g. Most preferred aramid fibers will have a tenacity of at least about 23 g/d, a modulus of at least about 500 g/d and an energy-to-break of at least about 30 J/g. For example, poly(p-phenylene terephthalamide) filaments which have moderately high moduli and tenacity values are particularly useful in forming ballistic resistant composites. Examples are Twaron® T2000 from Teijin which has a denier of 1000. Other examples are Kevlar® 29 which has 500 g/d and 22 g/d as values of initial tensile modulus and tenacity, respectively, as well as Kevlar® 129 and KM2 which are available in 400, 640 and 840 deniers from du Pont. Aramid fibers from other manufacturers can also be used in this invention. Copolymers of poly(p-phenylene terephthalamide) may also be used, such as co-poly(p-phenylene terephthalamide 3,4' oxydiphenylene terephthalamide). Also useful in the practice of this invention are poly(m-phenylene isophthalamide) fibers sold by du Pont under the trade name Nomex®.

High molecular weight polyvinyl alcohol (PV-OH) fibers having high tensile modulus are described in U.S. Pat. No. 4,440,711 to Kwon et al., the disclosure of which is hereby incorporated by reference to the extent it is not inconsistent herewith. High molecular weight PV-OH fibers should have a weight average molecular weight of at least about 200,000. Particularly useful PV-OH fibers should have a modulus of at least about 300 g/d, a tenacity preferably at least about 10 g/d, more preferably at least about 14 g/d and most preferably at least about 17 g/d, and an energy to break of at least about 8 J/g. PV-OH fiber having such properties can be produced, for example, by the process disclosed in U.S. Pat. No. 4,599,267.

In the case of polyacrylonitrile (PAN), the PAN fiber should have a weight average molecular weight of at least about 400,000. Particularly useful PAN fiber should have a tenacity of preferably at least about 10 g/d and an energy to break of at least about 8 J/g. PAN fiber having a molecular weight of at least about 400,000, a tenacity of at least about 15 to 20 g/d and an energy to break of at least about 8 J/g is most useful; and such fibers are disclosed, for example, in U.S. Pat. No. 4,535,027.

Suitable liquid crystal copolyester fibers for the practice of this invention are disclosed, for example, in U.S. Pat. Nos. 3,975,487; 4,118,372 and 4,161,470. Liquid crystal copolyester fibers are available under the designation Vectran® fibers from Kuraray America Inc.

Suitable polybenzazole fibers for the practice of this invention are disclosed, for example, in U.S. Pat. Nos. 5,286,833, 5,296,185, 5,356,584, 5,534,205 and 6,040,050. Polybenzazole fibers are available under the designation Zylon® fibers from Toyobo Co.

Rigid rod fibers are disclosed, for example, in U.S. Pat. Nos. 5,674,969, 5,939,553, 5,945,537 and 6,040,478. Such fibers are available under the designation M5® fibers from Magellan Systems International.

The fabric of this invention may be in the form of woven, knitted or non-woven fabrics formed from the high tenacity fibers, most preferably high tenacity extended chain polyethylene fibers. Preferably, at least about 50% by weight of the fibers in the fabric are such high tenacity fibers, more preferably at least about 75% by weight of the fibers in the fabric are such high tenacity fibers, and most preferably all of the fibers in the fabric are such high tenacity fibers. Most preferred are fabrics in which all of the fibers are high tenacity fibers. As mentioned above, blends of two or more high tenacity fibers may be utilized, as well as blends with other fibers.

The yarns may be in essentially parallel alignment (unidirectionally aligned), or the yarns may be twisted, overwrapped or entangled. The fabrics of the invention may be woven with yarns having different fibers in the warp and weft directions, or in other directions.

As mentioned above, the high strength fibers may be in the form of a woven, knitted or non-woven fabric. One preferred material is a woven fabric formed from SPECTRA® extended chain polyethylene fibers.

In one embodiment, the fabric preferably has between about 15 and about 55 ends per inch (about 5.9 to about 21.6 ends per cm) in both the warp and fill directions, and more preferably between about 17 and about 45 ends per inch (about 6.7 to about 17.7 ends per cm). The yarns preferably have a denier of from about 215 to about 1300. The result is a woven fabric weighing preferably between about 2 and about 17 ounces per square yard (about 67.8 to about 576.3 g/m$^2$), and more preferably between about 5 and about 12 ounces per square yard (about 169.5 to about 406.9 g/m$^2$). Examples of such fabrics are those designated as SPECTRA® fabric styles 902, 904, 952, 955 and 960. Other examples included fabrics formed from basket weaves, such as SPECTRA® fabric style 912. As those skilled in the art will appreciate, the fabric constructions described here are exemplary only and not intended to limit the invention thereto. Each of these uncoated fabrics is available from Hexcel of Anderson, S.C., and is made from SPECTRA® fiber:

| Style | Weave | Weight (Oz/Yd$^2$) | Thickness (Inches) | Counts (Ends/Inch) | Yarn Denier (Warp/Fill) |
|---|---|---|---|---|---|
| 902 | Plain | 5.5 | 0.018 | 17 × 17 | 1200/1200 |
| 904 | Plain | 6.0 | 0.017 | 34 × 34 | 650/650 |
| 952 | Plain | 6.0 | 0.017 | 34 × 34 | 650/650 |
| 912 | Basket | 11.3 | 0.028 | 34 × 34 | 1200/1200 |

As shown in the table, a plain weave fabric having 17 ends per inch is of 1200 denier SPECTRA® 900 fiber in both the warp and fill directions weighs only about 5.5 ounces per square yard (about 186.5 g/m$^2$), but has a breaking strength of greater than 800 pounds force per inch (1401 N/cm) in both directions. Other weaves than a plain weave may be employed, such as a basket weave as indicated.

If a woven fabric is employed, it may be of any weave pattern, including plain weave, basket weave, twill, satin, three dimensional woven fabrics, and any of their several variations. Plain and basket weave fabrics are preferred and more preferred are such fabrics having an equal warp and weft count. The woven fabric preferably does not include a resin matrix, but one may be employed if desired, as discussed below with respect to the non-woven fabrics. Such resin matrix should be sufficiently translucent so as to not detract from the light transmitting nature of the composite material. If a resin matrix is employed with a woven fabric, the fabric may be surface coated or fully impregnated with a suitable resin matrix. For example, the woven fabric may be spray coated with the resin matrix or dipped into a container containing the resin matrix, after which the water or solvent is driven off.

The high strength fabrics used in the composite structure are relatively thin yet very strong. The preferred thickness of the fabrics are from about 0.005 to about 0.036 inches (127 to 911 μm), more preferably from about 0.011 to about 0.028 inches (279 to 711 μm), and most preferably from about 0.015 to about 0.023 inch (381 to 584 μm). The fabrics preferably also have low stretch characteristics (typically an elongation of 5% or less) and thus are effective as outside screens for windows or doors. The polyolefin fabrics in particular are not adversely affected by water, so that they are not degraded by wind driven water.

Besides the preferred woven fabrics, other types of high tenacity fabrics that may be employed in this invention include knitted fabrics and non-woven fabrics, such as plies of unidirectionally oriented fibers, or fibers which are felted in a random orientation. Such felted fabrics may-be compressed to a desired thickness. Typically, the non-woven fabrics are embedded in a suitable resin matrix, as is known in the art. Fabrics formed from unidirectionally oriented fibers typically have one layer of fibers which extend in one direction and a second layer of fibers which extend in a direction 90° from the first fibers. Where the individual plies are unidirectionally oriented fibers, the successive plies are preferably rotated relative to one another, for example at angles of 0°/90° or 0°/45°/90°/45°/0° or at other angles.

If a resin matrix is employed, it may be formed from a wide variety of thermoplastic, and preferably elastomeric, materials having desired characteristics as is known in the art. In one embodiment, the elastomeric materials used in such matrix possess initial tensile modulus (modulus of elasticity) equal to or less than about 6,000 psi (41.4 MPa) as measured by ASTM D638. More preferably, the elastomer has initial tensile modulus equal to or less than about 2,400 psi (16.5 MPa). Most preferably, the elastomeric material has initial tensile modulus equal to or less than about 1,200 psi (8.23 MPa). These resinous materials are typically thermoplastic in nature.

The proportion of the resin matrix material to fiber in the fabric matrix preferably forms about 1 to about 98 percent by weight, more preferably from about 5 to about 95 percent by weight, and most preferably from about 5 to about 40 percent by weight, of the total weight of the fabric matrix.

A wide variety of thermoplastic materials may be utilized as the resin matrix. For example, any of the following materials may be employed: polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride using dioctyl phthalate or other plasticizers well known in the art, butadiene acrylonitrile elastomers, poly (isobutylene-co-isoprene), polyacrylates, polyesters, polyethers, fluoroelastomers, silicone elastomers, thermoplastic elastomers, and copolymers of ethylene.

One preferred group of materials for high tenacity fiber fabrics, in particular high tenacity extended chain polyethylene fiber fabrics, are block copolymers of conjugated dienes and vinyl aromatic copolymers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type $R-(BA)_x=3-150)$; wherein A is a block from a polyvinyl aromatic monomer and B is a block from a conjugated diene elastomer. Preferably the resin matrix is a flexible thermoplastic material. A preferred resin matrix is an isoprene-styrene-isoprene block copolymer, such as Kraton® D1107 isoprene-styrene-isoprene block copolymer available from Kraton Polymer LLC.

In general, non-woven fabrics useful herein are preferably formed by constructing a fiber network initially and then coating the network with the matrix composition. As used herein, the term "coating" is used in a broad sense to describe a fiber network wherein the individual fibers either have a continuous layer of the matrix composition surrounding the fibers or a discontinuous layer of the matrix composition on the surface of the fibers. In the former case, it can be said that the fibers are fully embedded in the matrix composition. The terms coating and impregnating are interchangeably used herein. The non-woven fabric may be constructed via a variety of methods. In the preferred case of a unidirectionally aligned fabric, yarn bundles of the high tenacity filaments are supplied from a creel and led through guides and one or more spreader bars into a collimating comb prior to coating with the matrix material. The collimating comb aligns the filaments coplanarly and in a substantially unidirectional fashion.

The high tenacity fabrics may be coated with the chosen matrix resin by applying the matrix composition to the fibers and then consolidating the matrix composition/high tenacity fibers in a known manner. By "consolidating" is meant that the matrix material and the fiber network layer are combined into a single unitary layer. Consolidation can occur via drying, cooling, heating, pressure or a combination thereof. In the case of unidirectional non-woven fabrics, for example, one known technique is to pass the fibers from a creel and through a combing station to form a unidirectional fiber network. The fiber network is then placed on a carrier web and the matrix resin is coated thereon, such as by spraying or dipping using a roll coater or the like. The coated fiber (unitape) is then passed through an oven to evaporate the water or strip off the solvent from the composition and is wound up on a roller. The carrier web may be stripped from the fabric upon rolling or may be stripped when the fabric is used.

As mentioned above, the fabric may also be in the form of a knitted fabric. Knit structures are constructions composed of intermeshing loops, with the four major types being tricot, raschel, net and oriented structures. Due to the nature of the loop structure, knits of the first three categories are not as suitable as they do not take full advantage of the strength of a fiber. Oriented knitted structures, however, use straight inlaid yarns held in place by fine denier knitted stitches. The yarns are absolutely straight without the crimp effect found in woven fabrics due to the interlacing effect on the yarns. These laid in yarns can be oriented in a monoaxial, biaxial or multiaxial direction depending on the engineered requirements. It is preferred that the specific knit equipment used in laying in the load bearing yarns is such that the yarns are not pierced through. As with the woven fabrics, the knitted fabrics may include a resin matrix.

The high tenacity fiber fabric itself may have a desired degree of translucency. For example, the high tenacity fabric may transmit at least about 60 percent, preferably at least about 65 percent, and more preferably at least about 75 percent, of light. Stated another way, preferably, the high tenacity fiber fabric transmits from about 60 to about 90 percent of light, more preferably from about 65 to about 85 percent of light, and most preferably from about 75 to about 85 percent of light. Light transmission can be determined, for example, based on the procedure of ASTM D 1746.

The high strength fabric has first and second surfaces. Attached to at least a portion of one of such surfaces is at least one ultraviolet resistant layer which extends outwardly of the high strength fabric. The UV resistant layer may be attached to both surfaces of the high strength fabric, and preferably is attached to substantially the entire surface of one or both surfaces of the high strength fabric. The UV resistant layer is resistant to both UVA and UVB radiation. The UV resistant layer is preferably in the form of a fabric, although other forms of the UV resistant layer may be employed, such as films and the like. The fabric is preferably in the form of a woven fabric, although non-woven, knitted and other fabrics may alternatively be utilized.

By resistant to UV radiation is meant that, in general, the UV resistant layer limits transmission of both UVA and UVB rays to less than about 10% of the UV radiation incident upon such layer. Preferably, the UV resistant layer transmits less than about 5% of the UVA and UVB radiation, more preferably less than about 2% of the UV radiation, still more preferably less than about 0.5% of the UV radiation, and most preferably less than 0.2% of the UV radiation.

As mentioned above, the UV resistant layer may be attached to only a portion of the high strength fabric. For example, the UV resistant layer may be attached to the top portion (e.g., a few inches or centimeters from the top edge) of the high strength fabric, such that when the composite fabric is rolled up the otherwise exposed area of the high strength fabric is covered by the UV resistant layer. This provides an aesthetically attractive structure which is resistant to UV radiation. Alternatively and preferably, the UV resistant layer is attached to all or substantially all of the entire surface area of the high strength fabric layer; in this way, the high strength fabric layer is protected both when it is unrolled or otherwise covers the building opening, or is in a rolled up configuration. The UV resistant layer not only provides the composite fabric with protection against UV radiation but also can enhance the appearance of the composite fabric due to different colors and/or designs in the UV resistant layers.

One factor influencing the degree of UV radiation blocking is the color of the UV resistant fabric or other layer. For example, the preferred Sunbrella® acrylic spun dyed fabric, the percent transmission of UVA and UVB rays is in the approximate 0.01% range for such colors as taupe, navy, forest green or black, and somewhat higher for other colors such as beige or red.

The UV resistant layer may be formed of any suitable material. Preferably, the UV resistant layer is formed from a thermoplastic material which is resistant to ultraviolet radiation. When the ultraviolet resistant layer is in the form of a fabric, preferably the fabric is a woven fabric made from acrylic yarns. However, other yarn materials may alternately be employed or blended with the acrylic yarns. For example, films of polyvinylidene fluoride, polycarbonate or the like may be employed. The UV resistant layer may alternatively be in the form of a film or the like. Typical films may have a thickness of from about 0.1 to about 10 mils (2.5 to 25 µm), more preferably from about 0.2 to about 2 mils (5 to 50 μm), and most preferably from about 0.5 to about 1.5 mils (12.5 to 37.5 μm).

The woven UV resistant fabric may have any suitable weave pattern and may be formed from yarns of any suitable denier. For example, the denier may range from about 50 to about 5000, more preferably from about 200 to about 2600. The weight of the UV resistant fabric or other material is chosen to provide the requisite UV resistance as well as lightness of the structure. For example, the UV resistant fabric or other layer may have a weight of about 2 to about 16 oz./yd$^2$ (about 67.8 to about 542.6 g/m$^2$), more preferably from about 5 to about 10 oz/yd$^2$ (about 169.6 to about 339.1 g/m$^2$).

One preferred UV resistant fabric is a solution dyed acrylic fabric designated Sunbrella®, which is available from Glen Raven. One example is a fabric which is woven from 18s 2 ply yarn, which is two 18s single ply yarn twisted together to make a yarn having a denier of about 600.

UV resistant materials are known in the art and are available from a number of sources. These materials usually are formed with one or more UV absorbers which may be blended into the material or coated thereon, although other techniques may be employed to provide UV resistant materials. Examples of such materials are ultraviolet absorbers based on benzophenones, benzotriazoles, triazines, and oxanilides. These include 2-(4,6-diphenyl-1,3,5-triazin-2-yl)-5-hexyloxy phenol; 2-[4,6-bis(2,4-dimethylphenyl)-1,3,5-triazin-2-yl]-5-octyloxy phenol; 2-(2H-benzotriazol-2-yl)-p-cresol; 2-(2H-benzotriazol-2-yl)-4,6-bis(1-methyl-1-phenylethyl)phenol; 2-ethoxy-2'-ethyloxanilide; 5-tert-butyl-2-ethoxy-2'-ethyloxanilide; propanedioic acid; [(4-methoxyphenyl)-methylene]-; and bis(1,2,2,6,6-pentamethyl-4-piperidinyl)ester. Two or more stabilizer types may be used in parallel. The UV absorbers may be present in any desired amount, typically from about 0.1 to about 2 weight percent based on the total weight of the fiber or fabric, and with some applications up to about 5%.

As is known, these materials absorb light in the ultraviolet portion of the spectrum between about 275 nm and about 400 nm, which results in fabrics which are opaque to UV light. The UV absorbers are commercially available from a number of sources.

The high tenacity fiber layer(s) and the UV resistant layer (s) may be attached to each other any suitable means. Preferably, an adhesive or bonding layer is employed between these layers. Preferably the bonding layer is a thermoplastic material, but thermosetting materials such as flexible epoxies or high elongation polyurethanes, as well as pressure sensitive adhesives, can also be employed. The bonding layers may be in resin form or cast film form. Preferred thermoplastic bonding materials for the bonding layer are films of olefin polymers or copolymers having a melting point or melting point range less than about 140° C., particularly ethylene polymers and copolymers (e.g., ethylene/propylene copolymers). Melting point is determined, for example, by differential scanning calorimetry (DSC) at a heating rate of 10° C. per minute. The most preferred bonding materials are low density polyethylene (LDPE), ethylene vinyl acetate (EVA) and LDPE/EVA copolymers, especially when the high tenacity fibers are extended chain polyethylene fibers. The bonding layer can be applied in any suitable form, although a film is particularly preferred. The film can be used to coat and bond to the high performance fabric base described hereinabove, while creating the intermediate bonding layer. EVA bonds particularly well to fabric woven from yarns containing high-strength, high molecular weight polyethylene fibers. The EVA layer acts as a highly satisfactory intermediate bonding layer that has a bonding affinity for both the polyethylene fabric base layer and the UV resistant layer. In addition, the EVA layer and other olefin-containing polymer layers provide resistance to penetration by wind-blown water to the composite structure.

Alternatively, the UV resistant layer(s) may be attached to the high tenacity fiber layer(s) by stitching, other mechanical fastening systems, etc.

If desired, plastic films (preferably thermoplastic films) may be attached to the high tenacity fiber layer(s) and the UV resistant layer(s) are attached to the plastic film layer(s). These films are preferably thin films, typically having a thickness of from about 0.1 to about 10 mils (2.5 to 25 μm), more preferably from about 0.2 to about 2 mils (5 to 50 μm), and most preferably from about 0.5 to about 1.5 mils (12.5 to 37.5 μm). The plastic films may be formed from polyolefins such as polyethylene (including low density polyethylene, linear low density polyethylene and ultrahigh molecular weight polyethylene), polypropylene and the like, fluoropolymers such as polytetrafluoroethylene, polychlorotrifluoroethylene homopolymers and copolymers and the like, as well as polyesters, nylons, polycarbonates, and the like. Most preferably the film is a low density polyethylene film. The plastic film should be resistant to water in order to provide enhanced water resistance to the fabric. These plastic film layer(s) serve the purpose of preventing the adhesive layer (if employed) from penetrating to the UV resistant layer(s), and also prevent sticking of layers together when in roll form which could occur if the EVA or other adhesive were to exude into and through the high tenacity fiber layer(s) or the UV resistant layer(s). Thus, in roll form the plastic film layer or layers prevents adjacent layers from sticking together, which may otherwise occur during hot weather.

The composite fabric may be formed from multiple layers of high strength fabric layers and UV resistant layers, preferably in an alternating manner (and alternatively including plastic film layers). As pointed out above, the UV resistant layer(s) may be adhered to one or both surfaces of the fabric layer in any suitable manner, such as by heating and/or pressure, coating (including extrusion coating), use of an adhesive, or the like. Suitable techniques are described, for example, in U.S. Pat. No. 6,280,546, the disclosure of which is expressly incorporated herein by reference to the extent it is not inconsistent herewith.

The composite fabric of this invention is flexible and can be rolled up when not in its protective position covering an opening in a building. The fabric may be used in a manual or electric shutter system and serve to act as a storm curtain. Also, the fabric can be releaseably connected to the building structure in a position covering an opening by a retainer. The word "retainer" as used herein refers to a frame, restraint, assembly, guide, roller, or one or more fasteners, such as grommets which receive a screw and wing nut type fastening, or any other suitable fastening device. In one embodiment, the fabric can be mounted on a suitable roller and rolled down into its protective position around a door or window in a building. Suitable provision should be made to secure the bottom and possibly the edge portions of the storm curtain in place. Typical means include the use of metal supporting channels or grommets on the bottom and/or edges of the curtain through which a suitable tie down device may be placed. In another embodiment, the composite fabric may be used in sheet form (which is foldable for storage) and include grommets along a portion or all of its periphery, with the grommets being adapted to receive a screw and wing nut type fastener or any other suitable fastening device.

Preferably, the composite fabric of the invention has a combined thickness of from about 6 to about 60 mils (150 to 1500 μm), more preferably from about 10 to about 50 mils (250 to 1250 μm), and most preferably from about 25 to about 50 mils (625 to 1250 μm). In addition, the composite fabric preferably has a weight of from about 2 to about 30 oz/yd$^2$ (67.8 to 1017 g/m$^2$), more preferably from about 5 to about 25 oz/yd$^2$ (169.5 to 847.5 g/m$^2$), and most preferably from about 10 to about 22 oz/yd$^2$ (339 to 745.8 g/m$^2$).

Some of the various embodiments of the composite fabric of this invention comprise the overall structure of the following layers (from outer to inner layers):

Due to their light weight, the composite fabrics of this invention are easy to wind up if in roll form and are easy to manually maneuver for installation/removal if in sheet form. As is known in the art and in conformance with various building standards, the composite fabric is placed a predetermined distance from a window or door to be protected. The composite fabrics can be designed to limit the amount of deflection from impacting objects so as to be in conformance with various storm building codes.

Because they are formed from high tenacity fibers, the composite materials of this invention are lightweight, strong, impact resistant, and inert to water. They provide excellent protection as a storm curtain or the like for a building to protect various openings in a building, including doors and windows. Also, due to the presence of the UV resistant layer (s), the composite materials resist fading and can thus be left in place for extended periods of time without adversely affecting the aesthetics of the product. The low stretch characteristic of the high tenacity fibers, particularly extended chain polyethylene fibers, makes the resultant fabric an effective outside protective screen for building openings.

As mentioned above, one preferred type of UV resistant layer is a solution dyed acrylic fabric. Such a material is available in many aesthetically appealing designs. Hence, the composite storm screen of this invention can be coordinated with various colors and styles of building exteriors. As a result, the storm screen can be left in place for extended periods of time and not detract from the overall aesthetics of a building. In fact, the composite screen can enhance the overall appearance of the exterior of a building, as well as the interior if another layer of the UV resistant fabric (or other material) is provided and which faces towards the inside of the structure.

The following non-limiting examples are presented to provide a more complete understanding of the invention. The specific techniques, conditions, materials, proportions and reported data set forth to illustrate the principles of the invention are exemplary and should not be construed as limiting the scope of the invention. All percents are by weight, unless otherwise stated.

EXAMPLES

Example 1

A flexible composite fabric was formed from a single ply fabric made of extended chain polyethylene fibers. The fibers were Spectra® 900, 1200 denier yarn available from Honeywell International Inc. and have a tenacity of 30 g/d. The fabric was in the form of a plain weave woven fabric (style 903 made by Hexcel Reinforcements Corp.), characterized as having a weight of 7 oz/yd$^2$ (237 g/m$^2$), 21×21 ends per inch (8.3×8.3 ends per cm), a yarn denier of 1200 in both the warp and weft, and a thickness of 20 mils (0.51 mm). The fabric was laminated on both sides to a low density polyethylene film having a thickness of 1.5 mil (38.1 μm). A 4 mil (100 μm) film of ethylene vinyl acetate was used as a bonding layer between the fabric layer and the two polyethylene film layers. The layers were laminated together by a thermal lamination technique as described in U.S. Pat. Nos. 6,280,546 and 6,818,091.

A sample of the fabric measuring 108 inch high by 103 inch wide (274.3×216.6 cm) was attached to a solution dyed acrylic fabric (Sunbrella® from Glen Raven) which has a construction of 76 ends and 36 pick, a weight of 9.00 oz./yd$^2$ (305.1 g/m$^2$), a break strength of 285 lbf (1267.7 Newtons) in the warp and 180 lbf (800.6 Newtons) in the filling. The yarns have a denier of about 600. The Spectra® fabric was attached to the Sunbrella® fabric by stitching around the perimeter of both fabrics. The Sunbrella® fabric, which had a similar dimension as the Spectra® fabric, was dyed a jockey red color and had a percent transmission of UVA rays of about 0.08 and a percent transmission of UVB rays of about 0.11.

The total composite fabric weight was 25 oz/yd$^2$ (847.5 g/m$^2$), and the total composite fabric thickness was 0.047 inch (1.19 mm). The composite had a grab strength in the range of 1030 to 1240 pounds force per inch (180 to 217 kN/m) of fabric width, as measured by ASTM 1682.

Another sample of the Spectra® laminated fabric measuring 42 inch high by 42 inch wide (106.7×106.7 cm) was similarly attached by stitching to a sample of the same Sunbrella® fabric having similar dimensions as the Spectra® fabric.

Both samples of the composite fabric were tested as a hurricane curtain according to ASTM E1886/1996 (equivalent to the State of Florida Building Code Testing Application Standard TAS 201). These standards involve shooting a "large missile" (#2 Southern Pine stud, 2"×4"×96" (5.1 cm×10.2 cm×243.8 cm) in dimensions, 9 lbs (4.1 kg) in weight) at 50 ft/s (15.24 m/s) perpendicularly at the fabric. The composite curtain is mounted onto a wooden frame using metal grommets located on its top and bottom edges (its sides were left unattached), with the Sunbrella® fabric facing the direction of impact. Two impacts were made—one at the exact center of the composite curtain and the other at a corner, about 7 inches (17.8 cm) from the edges of the same curtain. Both samples of the composite curtain passed both impacts without tear or crack in the fabric. The same curtain samples (after 2 impacts) also passed a cyclic wind load test of ±60 pounds per square foot (2.87 kPa) (equivalent to a hurricane wind speed of 153 miles per hour (244.8 kilometers per hour) according to ASTM E1886/1996 (TAS 203).

Example 2

Example 1 was repeated except that the Spectra® fabric was a basket weave woven fabric (style 912 made by Hexcel), characterized as having a weight of 11.7 oz/yd$^2$ (396.6 g/m$^2$), 34×34 ends per inch (13.4×13.4 ends per cm), a yarn denier of 1200 in both the warp and weft, and a thickness of 28 mils (700 μm).

Three samples of the composite fabric were tested as in Example 1. One sample measured 48 inch high by 42 inch wide (121.9×106.7 cm), the second sample measured 78 inch high by 68 inch wide (198.1×172.7 cm), and the third sample measured 108 inch high by 103 inch wide (274.3×261.6 cm). These samples were similarly attached by stitching to samples of the same Sunbrella® fabric having similar dimensions as the Spectra® fabric samples.

All three samples of the composite fabric were tested as a hurricane curtain as in Example 1. All three samples of the composite curtain passed both impacts without tear or crack in the fabric. The same curtain samples (after 2 impacts) also passed a cyclic wind load test of ±60 pounds per square foot (2.87 kPa) (equivalent to a hurricane wind speed of 153 miles (244.8 kilometers) per hour) according to ASTM E1886/1996 (TAS 203).

Example 3

Example 1 is repeated but with the low density polyethylene film and the EVA layer bonding being attached only to one side of the Spectra® fabric. The Sunbrella® fabric is bonded to the other side of the Spectra® fabric by a 4 mil (100 µm) film of ethylene vinyl acetate, with the Sunbrella® fabric facing outwardly. When tested as in Example 1, it is noted that the composite fabric passes the tests.

Example 4

Example 3 is repeated but without the low density polyethylene film and its EVA bonding layer. When tested as in Example 1, it is noted that the composite fabric passes the tests.

Example 5

Example 1 is repeated except that the Sunbrella® fabric is bonded to one side of the composite fabric by means of an EVA film. When tested as in Example 1, the composite fabric passes the tests.

Example 6

Example 5 is repeated except that the Sunbrella® fabric is bonded to both sides of the composite fabric by means of an EVA film attached to each Sunbrella® fabric. When tested as in Example 1, the composite fabric passes the tests.

Example 7

Example 1 is repeated with an aramid woven fabric in the place of the polyethylene woven fabric. Similar results are noted.

Example 8 (Comparative)

In comparison, a standard vinyl coated polyester fabric weighing 36.52 oz/yd$^2$ (0.124 g/cm$^2$) and having a thickness of 0.042 inch (1.1 mm) is subject to the same impact test as in Example 1. The fabric fails the test as the stud penetrates the fabric. The fabric has a deflection of more than 22.2 inches (56.39 cm) at ±60 pounds per square foot (2.87 kPa).

As can be seen, the composite fabrics of this invention have better impact resistance than conventional fabric screening and are lighter in weight. They are capable of withstanding hurricane force winds and have excellent fade resistance due to their very high blockage of UVA and UVB light. Accordingly, building openings can be protected against hurricane force winds with the fabrics described herein and still provide an aesthetically attractive overall screening product.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A building having at least one opening, said opening being protected from hurricane force winds and associated flying objects by a flexible composite fabric covering said opening, said flexible composite fabric comprising:
    (a) at least one base layer of a fabric comprising high tenacity fibers having first and second surfaces;
    (b) at least one ultraviolet resistant layer extending outwardly from said base fabric layer and attached to at least a portion of at least one of said first and second surfaces of said base fabric layer, said ultraviolet resistant layer comprising an ultraviolet resistant woven fabric formed from ultraviolet resistant yarns, said ultraviolet resistant woven fabric overlying the top portion only of said base fabric layer; and
    (c) at least one plastic film layer bonded to at least one of said first and second surfaces of said base fabric layer, whereby said opening is protected against hurricane force winds and associated flying objects.

2. The building of claim 1 wherein said flexible composite fabric further comprises a bonding layer which bonds said fabric layer to said ultraviolet resistant fabric.

3. The building of claim 1 wherein the thickness of said composite fabric is from about 6 to about 60 mils (150 to 1500 µm).

4. The building of claim 1 wherein said fibers comprise high tenacity polyethylene fibers.

5. The building of claim 1 wherein said base layer fabric comprises a woven fabric.

6. The building of claim 5 wherein said ultraviolet resistant woven fabric comprises acrylic yarns.

7. The building of claim 1 wherein said base fabric comprises a woven fabric comprising extended chain polyethylene fibers, said ultraviolet resistant woven fabric comprises acrylic yarns, and further including a bonding layer which bonds said base fabric layer to said ultraviolet resistant woven fabric.

8. The building of claim 7 wherein said ultraviolet resistant layer limits transmission of both ultraviolet A and ultraviolet B rays to less than about 0.5% of the ultraviolet radiation incident upon said ultraviolet resistant layer.

9. In a building having an opening, and a protective screening covering said opening, the improvement comprising said screening comprising a flexible composite fabric comprising:
    (a) at least one base layer of a fabric comprising high tenacity fibers having first and second surfaces; and
    (b) at least one ultraviolet resistant layer extending outwardly from said base fabric layer and attached to at least a portion of at least one of said first and second surfaces of said base fabric layer, said ultraviolet resistant layer comprising an ultraviolet resistant woven fabric formed from ultraviolet resistant yarns, said ultraviolet resistant woven fabric overlying the top portion only of said base fabric layer; and
    (c) at least one plastic film layer bonded to at least one of said first and second surfaces of said base fabric layer; whereby said opening is protected against hurricane force winds and associated flying objects.

10. The building of claim 9 wherein said high tenacity fibers comprise high tenacity polyethylene fibers and said ultraviolet resistant woven fabric comprises acrylic yarns.

11. The building of claim 10 wherein said flexible composite fabric further comprises a bonding layer which bonds said base fabric layer to said ultraviolet resistant fabric, said bonding layer comprising a thermoplastic material.

12. A method of protecting a building opening from hurricane force winds and associated flying objects, said method comprising providing a screening for said building opening, said screening comprising a flexible composite fabric covering said opening, said flexible composite fabric comprising:

(a) at least one base layer of a fabric comprising high tenacity fibers having first and second surfaces; and (b) at least one ultraviolet resistant layer extending outwardly from said base fabric layer and attached to at least a portion of at least one of said first and second surfaces of said base fabric layer, said ultraviolet resistant layer comprising an ultraviolet resistant woven fabric formed from ultraviolet resistant yarns, said ultraviolet resistant woven fabric overlying the top portion only of said base fabric layer; and (c) at least one plastic film layer bonded to at least one of said first and second surfaces of said base fabric layer;

whereby said opening is protected against hurricane force winds and associated flying objects.

13. The method of claim 12 wherein said high tenacity fibers comprise high tenacity polyethylene fibers, said ultraviolet resistant fabric comprises acrylic yarns and further comprising a bonding layer between said base fabric layer and said ultraviolet resistant fabric.

14. A lightweight storm curtain for covering at least one opening in a building structure, such as windows, doors, sliding glass doors and the like, and for protecting said opening from hurricane force winds and associated flying objects, said storm curtain comprising a flexible composite fabric, said fabric comprising:

(a) at least one base layer of a fabric having first and second surfaces, said fabric comprising yarns comprising high tenacity fibers;

(b) at least one ultraviolet resistant layer extending outwardly from said base fabric layer and attached to at least a portion of at least one of said first and second surfaces of said base fabric layer, said ultraviolet resistant layer comprising an ultraviolet resistant woven fabric formed from ultraviolet resistant yarns, said ultraviolet resistant woven fabric overlying the top portion only of said base fabric layer; and (c) at least one plastic film layer bonded to at least one of said first and second surfaces of said base fabric layer.

15. The storm curtain of claim 14 wherein said high tenacity fibers comprise high tenacity polyethylene fibers.

16. The storm curtain of claim 15 wherein said ultraviolet resistant woven fabric comprises solution dyed acrylic yarns.

17. The storm curtain of claim 14 wherein said ultraviolet resistant fabric limits transmission of both ultraviolet A and ultraviolet B rays to less than about 0.5% of the ultraviolet radiation incident upon said ultraviolet resistant fabric.

18. The storm curtain of claim 14 wherein said base fabric layer and said ultraviolet resistant fabric are attached together by an adhesive layer.

19. The storm curtain of claim 18 wherein said adhesive layer comprises a layer of ethylene vinyl acetate.

20. The storm curtain of claim 14 wherein said base fabric layer and said ultraviolet resistant fabric are attached together by means of an adhesive layer comprising a layer of ethylene vinyl acetate, wherein said base fabric layer comprises a fabric formed of yarns comprising high tenacity polyethylene fibers, said yarns of said high tenacity polyethylene fibers having a denier in the range from about 50 to about 5000, and wherein said ultraviolet resistant fabric comprises acrylic yarns.

21. The storm curtain of claim 14 wherein the total weight of said composite fabric is in the range of from about 2 to about 30 oz/yd$^2$ (67.8 to 1017 g/m$^2$), and the total thickness of said composite fabric is in the range of from about 6 to about 60 mils (150 to 1500 μm).

22. A lightweight storm curtain for covering at least one opening in a building structure, such as windows, doors, sliding glass doors and the like, and for protecting said opening from hurricane force winds and associated flying objects, said storm curtain comprising:

(a) a flexible composite fabric comprising:

(i) at least one base layer of a fabric having first and second surfaces, said fabric comprising yarns comprising high tenacity fibers, said yarns having a denier in the range from about 50 to about 5000;

(ii) at least one ultraviolet resistant layer extending outwardly from and attached to at least a portion of said base fabric layer, said ultraviolet resistant layer comprising an ultraviolet resistant woven fabric formed from ultraviolet resistant yarns, said ultraviolet resistant woven fabric overlying the top portion only of said base fabric layer;

(iii) at least one adhesive layer bonding one of said surfaces of said base layer to said ultraviolet resistant layer; and (iv) at least one plastic film layer bonded to at least one of said first and second surfaces of said base fabric layer; and (b) a retainer releaseably connecting said composite fabric to said building structure in such a manner as to cover said opening;

said composite fabric layer providing protection against high wind and impact from projectiles, and said ultraviolet resistant woven fabric protecting the otherwise exposed area of said base fabric layer from ultraviolet radiation when said composite fabric is rolled up.

23. The storm curtain of claim 22 wherein said base fabric comprises a woven fabric comprising high tenacity polyethylene fibers, said ultraviolet resistant woven fabric comprises an ultraviolet resistant acrylic fabric having a weight in the range of from about 2 to about 16 oz/yd$^2$ (67.8 to 542.6 g/m$^2$) and comprising solution dyed acrylic yarns.

24. The storm curtain of claim 14 wherein said first surface of said base fabric layer is an inner surface that faces said opening and said second surface of said base fabric layer is an outer surface that faces the exterior of said building structure, and said ultraviolet resistant woven fabric being attached to said second surface of said base fabric layer.

25. The storm curtain of claim 14 wherein said ultraviolet resistant fabric is stitched to said base fabric layer.

26. The storm curtain of claim 16 wherein said at least one plastic film layer comprises a polyethylene film and further comprising a layer of ethylene vinyl acetate bonding said polyethylene film to at least one of said first and second surfaces of said base layer.

* * * * *